United States Patent [19]
Burkhart et al.

[11] 4,267,288
[45] May 12, 1981

[54] EPOXY-URETHANES BASED ON COPOLYESTERS

[75] Inventors: Dean C. Burkhart, Ft. Madison, Iowa; Lee R. Harper, Media; Eugene G. Sommerfeld, Penn Valley, both of Pa.

[73] Assignee: E. I. Du Pont de Nemours and Company, Wilmington, Del.

[21] Appl. No.: 59,888

[22] Filed: Jul. 23, 1979

Related U.S. Application Data

[63] Continuation-in-part of Ser. No. 899,697, Apr. 14, 1978, abandoned.

[51] Int. Cl.³ ............................................. C08L 63/00
[52] U.S. Cl. ..................................... 525/438; 525/28; 525/31
[58] Field of Search .................. 260/835; 525/438, 28

[56] References Cited

U.S. PATENT DOCUMENTS

| | | | |
|---|---|---|---|
| 3,158,586 | 11/1964 | Krause | 260/835 |
| 3,290,208 | 12/1966 | Lewis | 260/835 |
| 3,419,510 | 12/1968 | Hudak | 260/835 |
| 3,763,079 | 10/1973 | Fryd | 260/37 N |
| 3,804,810 | 4/1974 | Fryd | 260/75 NK |
| 4,086,293 | 4/1978 | Smith | 260/835 |

Primary Examiner—Paul Lieberman

[57] ABSTRACT

Described are polyester-urethane-epoxy adhesives produced by reacting one or more diols with two or more dicarboxylic acids to form a polyester prepolymer; chain-extending the prepolymer with an organic diisocyanate to yield a hydroxy-terminated polyester-urethane; capping the urethane partially or completely with a dicarboxylic acid or anhydride of dicarboxylic acid; and finally reacting with an epichlorohydrin/bisphenol A-type epoxy resin, forming an epoxy polyester-urethane block copolymer. The resulting product may then be crosslinked in use as an adhesive.

11 Claims, No Drawings

EPOXY-URETHANES BASED ON COPOLYESTERS

CROSS-REFERENCE TO RELATED APPLICATION

This is a continuation-in-part of our copending application Ser. No. 899,697, filed Apr. 14, 1978, now abandoned.

BACKGROUND OF THE INVENTION

1. Field of the Invention

This invention relates to adhesive compositions, particularly for organic materials.

2. Description of the Prior Art

Fryd U.S. Pat. No. 3,763,079, entitled "Polyurethanes Based on Mixed Aromatic-Aliphatic Polyesters", discloses the polyester/urethanes used as starting materials for the present invention. Fryd U.S. Pat. No. 3,804,810, entitled "Cross-Linked Polyurethanes Based on Aromatic/Aliphatic Copolyesters," discloses the cross-linking of the polyurethanes of the earlier patent. The disclosures of the two Fryd patents are specifically incorporated by reference herein.

SUMMARY OF THE INVENTION

This invention comprises improved adhesive compositions formed by capping polyester/urethanes of Fryd U.S. Pat. No. 3,763,079 with a dicarboxylic anhydride and chain-extending the capped polyester/urethanes with an epoxy resin and solutions of the adhesives in organic solvents.

DETAILED DESCRIPTION OF THE INVENTION

The epoxy urethanes of this invention are made by a four-step process of which the first two steps are those of U.S. Pat. No. 3,763,079 and the last two are actually carried out, at least partially, simultaneously. The chemistry of this process may be represented in words by the following schematic:

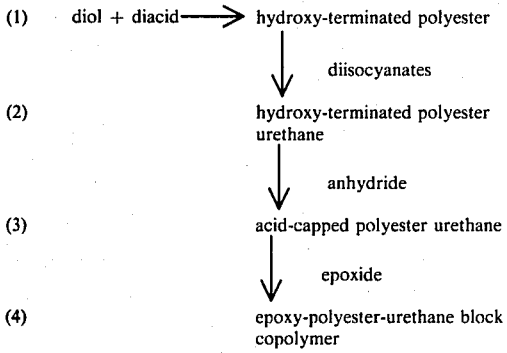

COPOLYESTER-URETHANES

Any of the polyester-urethanes of Fryd U.S. Pat. No. 3,763,079, prepared according to numbered steps (1) and (2) above, may be used in forming the present products, and the term "copolyester-urethane" as used in this specification refers to those of Fryd. These copolyester-urethanes are formed in a relatively conventional manner by reacting at least one of certain polyester prepolymers with at least one organic diisocyanate, the equivalent ratio of isocyanate contained on the diisocyanate to hydroxyl contained on the copolyester being less than 1/1.

The copolyesters are linear copolyesters produced by (1) an esterification reaction, i.e., the reaction of one or more diols or polyether glycols with at least two different dicarboxylic acids or two different anhydrides of dicarboxylic acids, or (2) by a transesterification reaction, i.e., the reaction of one or more diols or polyether glycols with at least two different esters of dicarboxylic acids.

The copolyesters are produced by conventional techniques which are well known. Ordinarily, the reactants will be admixed in a suitable reaction vessel with heating to a temperature of about 150° C.–250° C. for ½ to 8 hours to produce the polyester.

The diols can be aliphatic or aromatic. The hydrocarbon radicals in the diols can contain, be substituted with or interrupted with noninterfering groups such as N, O, S, halogen and the like. Suitable diols include:
ethylene glycol
propylene-1,2-glycol
propylene-1,3-glycol
butylene-1,3-diol
butylene-1,4-diol
butylene-2,3-diol
neopentyl glycol, i.e., 2,2-dimethylpropane-1,3-diol
2,2-diethylpropane-1,3-diol
2-methyl-2-propylpropane-1,3-diol
1,4-cyclohexanedimethanol
decamethylene glycol
dodecamethylene glycol
thioethylene glycol
N-methyl diethanolamine
monoethyl ether of glycerine
alpha- and beta-allyl ethers of glycerol, and the like.

Preferably, the diols will have about 2–8 carbon atoms; most preferably, they will have about 2–6 carbon atoms. A preferred diol is ethylene glycol.

If desired, one or more polyether glycols can be used with the diols. Suitable polyether glycols include polytetramethylene ether glycol, polyethylene glycol, polypropylene glycol, diethylene glycol and the like. Such polyether glycols can have a molecular weight of about 200–10,000, preferably about 500–4,000 and most preferably about 1,000. A preferred polyether glycol is polytetramethylene ether glycol.

The dicarboxylic acids can be aliphatic, cycloaliphatic, unsaturated or aromatic. The hydrocarbon radicals in the dicarboxylic acids can contain, be substituted with, or be interrupted by noninterfering groups such as O, S, N, halogen, keto and the like. Suitable dicarboxylic acids include: malonic, succinic, glutaric, adipic, pimelic, suberic, azelaic, sebacic, brassylic, maleic, fumaric, dilinoleic, diphenic, phthalic, tetrachlorophthalic, isophthalic, terephthalic, orthophthalic, cyclohexane dicarboxylic, p-phenylene diacetic, naphthalene dicarboxylic, dihydromuconic, beta-methyl adipic, trimethyl adipic, ethylether-2,2'-dicarboxylic, and the like.

If desired, one can use anhydrides of the above dicarboxylic acids such as phthalic anhydride, tetrahydrophthalic anhydride or the like. A preferred dianhydride is phthalic anhydride.

Preferred dicarboxylic acids include terephthalic acid, isophthalic acid, orthophthalic acid, azelaic acid, adipic acid, and a mixture of $C_4$–$C_6$ aliphatic dicarboxylic acids.

Preferably, the dicarboxylic acids or anhydrides of dicarboxylic acids will have about 4-12 carbon atoms.

The diisocyanates for use in forming the urethanes can be aliphatic or aromatic. Suitable isocyanates include:
hexane-1,6-diisocyanate
decane-1,10-diisocyanate
diisocyanates derived from dimerized fatty acids
phenylene-1,4-diisocyanate
toluene-2,4-diisocyanate
toluene-2,6-diisocyanate
naphthylene-1,5-diisocyanate
diphenylmethane-4,4'-diisocyanate
diphenylmethane-3,3'-dimethoxy-4,4'-diisocyanate
dicyclohexylmethane-4,4'-diisocyanate, etc.

Preferred are toluene-2,4-diisocyanate, toluene-2,6-diisocyanate and mixtures thereof.

Preferred polyester-urethanes are those formed by reacting a mixture of toluene-2,4-diisocyanate and toluene-2,6-diisocyanate (Hylene ® TM) with a prepolymer made from:

(A) terephthalic acid 28-38 mole percent, isophthalic acid 12-22 mole percent and azelaic acid 40-60 mole percent;

(B) orthophthalic acid or phthalic anhydride 40-60 mole percent and adipic acid 40-60 mole percent;

(C) terephthalic acid 45-65 mole percent and azelaic acid 35-55 mole percent;

(D) terephthalic acid 35-45 mole percent, isophthalic acid 35-45 mole percent, azelaic acid 5-15 mole percent and adipic acid 5-15 mole percent;

(E) terephthalic acid 45-55 mole percent, isophthalic acid 15-25 mole percent and azelaic acid 20-40 mole percent;

(F) orthophthalic acid or phthalic anhydride 40-60 mole percent and mixtures of $C_4-C_6$ aliphatic dicarboxylic acids 40-60 mole percent; or (G) terephthalic acid 5-15 orthophthalic acid or phthalic anhydride 40-60 mole percent and adipic acid 25-55 mole percent.

END-CAPPING AND CHAIN-EXTENDING

Whatever the copolyester-urethane chosen for further treatment, it is reacted under conditions generally standard for organic chemistry with (3) a dicarboxylic acid or anhydride and (4) an epoxide.

The dicarboxylic acid or anhydride chosen for step (3) of the schematic above can be any of those used for preparing the prepolymer polyester in Fryd U.S. Pat. No. 3,763,079 [step (1)]. They can be aliphatic, cycloaliphatic, unsaturated or aromatic. The hydrocarbon radicals in the dicarboxylic acids can contain, be substituted with, or be interrupted by noninterfering groups such as O, S, N, hydrogen, keto and the like. Suitable dicarboxylic acids include: malonic, succinic, glutaric, adipic, pimelic, suberic, azelaic, sebacic, brassylic, maleic, fumaric, dilinoleic, diphenic, phthalic, tetrachlorophthalic, isophthalic, terephthalic, orthophthalic, cyclohexane dicarboxylic, p-phenylene diacetic, naphthalene dicarboxylic, dihydromuconic, beta-methyl adipic, trimethyl adipic, ethylether-2,2'-dicarboxylic, and the like.

If desired, one can use anhydrides of the above dicarboxylic acids such as phthalic anhydride, tetrahydrophthalic anhydride or the like. A preferred dianhydride is phthalic anhydride. Trimellitic anhydride can also be used.

The epoxides used in step (4) are epichlorohydrin/bisphenol A resins. Examples are well known in the art, such as those sold under the trademark Epon ® [see Shell Chemical Company, Polymer Division, Bulletin S071-1 Epon ® Resins (1976)] having the formula

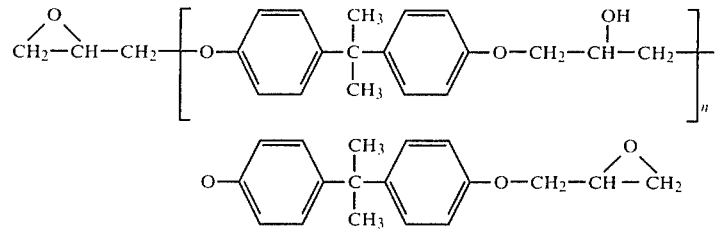

Preferred for use in this invention are compounds with the following characteristics, the value of n in the formula being such as to give the epoxide equivalent indicated:

| Solid Resin | Epoxide Equivalent | Melting Point |
| --- | --- | --- |
| Epon ® 1001 | 450-550 | 65-75 |
| Epon ® 1002 | 600-700 | 75-85 |
| Epon ® 1004 | 875-1025 | 95-105 |
| Epon ® 1007 | 1800-2500 | 125-135 |
| Epon ® 1009 | 2500-4500 | 145-155 |
| Epon ® 1010 | 4500-6000 | 155-165 |

Preferred for this invention is an epoxide equivalent of about 950 (Epon ® 1004 or equivalent). It will be clearly understood that other well-known commercial epoxy resins can be used as well as the Epons ®.

PROCESS

The process of preparing the products of this invention is relatively simple and can be accomplished in a single vessel (see examples below). A copolyesterurethane can be formed using the process of Fryd U.S. Pat. No. 3,763,079 and reacted, in a solvent or without one, with dicarboxylic acid or anhydride thereof in a mole ratio of polyester-urethane/dicarboxylic acid of 10/1 to 1/1. To the same vessel is added the epoxide in a mole ratio of polyester urethane/epoxide of 1/0.2 to 1/2 and the endcapping and/or chain-extension accomplished. Reaction time and temperature are not critical, and generally reflux can be used until the reactions are completed, as indicated in the examples, e.g., 30-60 minutes for reaction with the acid or anhydride and 2 hours or more with the epoxide.

ADHESIVES

The final products of this invention are in general organic solids, readily soluble in standard organic solvents. The solvents may, in fact, be solvents used in carrying out the synthetic reaction. When dissolved, the products are useful as adhesives.

Suitable solvents include aromatic hydrocarbons such as toluene, xylene, tetrahydronaphthalene, decahydronaphthalene, etc.; chlorinated hydrocarbons such as methylene chloride, chloroform, dichloroethane, trichloroethane; ethers such as diisopropyl ether, tetrahydrofuran, dioxane, ethylene glycol dimethyl ether, etc.; esters such as ethyl acetate, butyl acetate, etc.; ketones such as acetone, methyl ethyl ketone, methyl isobutyl ketone, cyclohexanone, etc. Solubility of the polymers greatly depends on the choice and ratios of the acids and diols from which they are made.

CROSS-LINKING

The epoxy-urethanes of this invention are very stable compounds. They are, however, subject to crosslinking and, when used as adhesives, will, in general, be cross-linked. The cross-linkers (or curing agents) can be organic compounds that contain groups reactive with the hydroxyl groups on the polyester-urethane-epoxy.

The cross-linkers have an average functionality greater than 2 [functionality is the number of groups (such groups being reactive with the hydroxyl groups on the epoxy-urethane) per molecule of cross-linker]. Often they will have an average functionality of about 3–6; preferably they will have an average functionality of about 2–6 and more preferably about 3–4.

One form of suitable cross-linkers is aliphatic or aromatic polyisocyanates including:
4,4′,4″-triisocyanato triphenyl methane
1,3,5-triisocyanato benzene
2,4,6-triisocyanato toluene, and the like
biurets of any of the previously-described diisocyanates such as the trimerization product of hexane-1,6-diisocyanate of the formula:

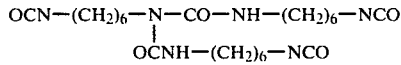

toluyl-2,4,6-triisocyanate
naphthalene-1,3,7-triisocyanate
diphenylmethane-2,4,4′-triisocyanate
triphenylmethane triisocyanate adduct of one or more diisocyanates (such as any of the previously-described diisocyanates) with one or more polyols containing about 3 to about 6 hydroxyl groups (such as propane triol, 1,2,6-hexane triol, trimethylolpropane, pentaerythritol, sorbitol and the like) to obtain a cross-linker having a functionality of greater than 2 but no greater than about 8.

A preferred polyisocyanate is the adduct of aromatic diisocyanates (such as any of the previously-described diisocyanates) with trimethylolpropane in a 3:1 or 5:2 mole ratio to yield a polyisocyanate having a functionality of 3 or 4, such as the adduct of toluene-2,4-diisocyanate, toluene-2,6-isocyanate or mixtures thereof with trimethylolpropane in a 5:2 mole ratio.

Amino or nitrogen-containing resins such as melamine-formaldehyde resins, urea-formaldehyde resins or benzoguanamine formaldehyde resin are another form of cross-linker. If such resins are used, it may be necessary to apply heat to obtain sufficient cross-linking.

If unsaturated copolyester is used (i.e., one made from at least some unsaturated acid or unsaturated acid anhydride) to produce the polyester-urethane, then such unsaturated polyester-urethane can be cross-linked by admixing it with a suitable free radical polymerization catalyst such as benzoyl peroxide. Of course, a free radical polymerization catalyst will not have the functionality the previously described cross-linkers have.

Just before use, the epoxy-polyester-urethane is admixed with the cross-linker. The equivalent ratio of reactive groups (contained on the cross-linker) to hydroxyls (contained on the epoxy-urethane) should be from about 1.0/1.0 to about 4.0/1.0, preferably about 1.5/1.0 to about 2.5/1.0. The mixture can contain about 0.5% to about 60%, preferably about 20% to about 60%, by weight epoxy-polyester-urethane and cross-linker which can be obtained by the evaporation or addition of solvent.

Crosslinking will take place at room temperature in about ½ hour to 5 days depending on the cross-linker used. To hasten cross-linking and to insure a good bond between the materials being adhered, heat and/or pressure can be applied.

UTILITY

As noted, cross-linked epoxy-urethanes of this invention are particularly useful as adhesives. Any suitable materials can be adhered with the cross-linked epoxy-urethanes of this invention including paper, cellulose, polyester including polyterephthalate, polypropylene, polyethylene, poly(vinyl chloride), copolymers of vinylidene chloride and vinyl chloride, vinyl acetate and copolymers of vinyl acetate with other free radical polymerizable monomers, polyamides, flexible films, including those made from any of the foregoing that are suitable for making flexible films, metal foils, rubber and the like. Of course, the same materials or different materials can be adhered to each other.

Ordinarily, the process for adhering materials will comprise:

(1) applying the mixture of the cross-linker and epoxy-urethane to the surface of material, (2) removing solvent by air-drying or heating, and (3) placing another material in contact with the mixture that has been applied to the material of (1).

If desired, a fourth step in the above process can be the application of heat, pressure or heat and pressure.

A mixture of epoxy-urethane and cross-linker can be applied to materials from a solution containing about 0.5–60%, preferably about 20% to about 60% by weight, of cross-linker and epoxy-urethane. If desired, the solution of the epoxy-urethane in its reaction media can be mixed with the cross-linker, and the product used directly, preferably after adjusting the percentage of solids, if necessary, by the evaporation of existing solvent or addition of more solvent. After the resulting solution is applied to material, the solvent is then removed.

If the mixture of cross-linker and epoxy-urethane is to be used as an adhesive, adjuncts such as inert high molecular weight compounds, e.g., poly(vinyl chloride), poly(vinyl acetate) and the like, can be added to the adhesive solutions.

EXAMPLES

There follow some examples illustrating aspects of the invention. Examples 7–10 show comparisons of the cross-linked compounds with commercial adhesives, and Example 11 shows the stability of the compounds.

Example 1

A prepolymer (553.9 g), prepared according to the method and of the composition shown in Example 1 of U.S. Pat. No. 3,763,079 (terephthalic acid, isophthalic acid, azelaic acid in molar ratios of 33/17/50 and ethylene glycol) and having a hydroxyl number of ca. 50 and acid number ca. 2 was placed in a 2-liter, 3-neck flask equipped with an agitator, reflux condenser and thermometer. To this prepolymer (molecular weight ca. 2244) was added 146.7 g of toluol, 0.16 g of dibutyltin dilaurate and 34.1 g of Hylene ® TM toluene diisocyanate. This mixture (a molar ratio of 1/0.8 prepolymer to diisocyanate) was heated to reflux temperature of about 127° C. and held for 2 hours.

At the end of the 2-hour hold period, 14.6 g of phthalic anhydride was added and the mixture of polyester-urethane/phthalic anhydride (molar ratio of 1/2) was refluxed for 40 minutes. At the end of this period, 53 g of methyl isobutyl ketone (MIBK) and 199.2 g of Epon ® 1004 were added. This mixture, which has a polyester-urethane/epoxide ratio of 1/2, was brought to reflux and held for two hours. At the end of the 2-hour period, the mixture was thinned with 778.5 g of methyl ethyl ketone (MEK) and cooled to room temperature. The resulting solution had a viscosity of 145 centipoises (cps). It was useful as an adhesive giving film-tearing bonds when coated on Mylar ®, dried and sealed to a second sheet of Mylar ® with a Sentinel heat sealer.

Example 2

In the equipment of Example 1, 553.9 g of the prepolymer of Example 1, 146.7 g of MIBK, 0.16 g of dibutyltin dilaurate and 37.5 g of Hylene ® TM were refluxed for 1 hour. At the end of the hour, 20.1 g of trimellitic anhydride, 188.6 g of an epoxide with an epoxide equivalent of 450–550 (Epon ® 1001) and 52.3 g of MIBK were added. Mole ratios corresponding to those shown in Example 1 are 33/17/50, 1/0.86, 1/2.5, 1/4.75. This mixture was heated to reflux and held two hours then thinned with 597.5 g of MEK and cooled. This product had a viscosity of 185 cps and gave Mylar ® tearing bonds when tested as described in Example 1, showing usefulness as an adhesive.

Example 3

A prepolymer was made by the method described in Example 1 of U.S. Pat. No. 3,763,079 in a 12-liter flask with 3780 g of ethylene glycol, 2227 g of terephthalic acid, 1147 g of isophthalic acid and 2967 g of adipic acid. This prepolymer was processed to a hydroxyl number of 32.5, an acid number of 2.0 or less, and a molecular weight of ca. 3452.

442.1 g of this prepolymer were added to a 2-liter flask, as in Example 1 above, containing 91.7 g of toluol, 30.5 g of MIBK and 0.1 g of dibutyltin dilaurate. 18 g of Hylene ® TM were added to the flask and the mixture heated to reflux and held 1 hour. At the end of the hold, 44.4 g of Epon ® 1007 and 1.5 g of phthalic anhydride were added and the mixture was again heated to reflux and held for two hours. The corresponding mole ratios are 33/17/50, 1/0.83, 1/0.5, 1/0.5. At the end of this period, 366.5 g of MEK were added and the solution was cooled. This solution has a viscosity of 2000 cps.

Four 50-gram samples of the above polymer solution were measured out and mixed with toluene diisocyanate prepolymer adduct (Mondur ® CB-75; Mobay Chemical Co.). The first sample was mixed with 1 g of CB-75, the second with 1.7 g, the third with 2.0 g and the fourth with 2.2 g. All were coated to a dry film thickness of 0.3 mils and tested as in Example 1. Peel strengths of 7.5 lbs./linear in., 6.8 lbs./linear in., 7.0 lbs./linear in. and 7.5 lbs./linear in., respectively, were recorded. A second set of laminates was tested after one week to allow for complete cross-linking. Values recorded were 6.3, 6.1, 5.4, and 5.6 lbs./linear inch, respectively. These results show that the product has excellent strength and is useful as an adhesive.

Examples 4 and 5

The following tables show compositions (in grams) and properties of products made and tested as in Example 3. Corresponding mole ratios of reactants used Examples 4 and 5 are 33/17/50, 1/0.83, 1/2, 1/0.7, and 33/17/50, 1/0.83, 1/2, 1/0.5, respectively.

TABLE I

| COMPOSITION | | |
|---|---|---|
| | Ex. 4 | Ex. 5 |
| Toluol | 96.2 | 87.7 |
| MIBK | 32.0 | 29.1 |
| Dibutyltin Dilaurate | 0.1 | 0.1 |
| Prepolymer Ex. 3 | 422.1 | 422.1 |
| Hylene ® TM | 18.0 | 18.0 |
| Epon ® 1009 | 64.1 | — |
| Epon ® 1004 | — | 18.6 |
| Phthalic Anhydride | 5.8 | 5.8 |
| MEK | 384.5 | 350.4 |

TABLE II

| | PROPERTIES | | | |
|---|---|---|---|---|
| Viscosity | Ex. 4 | | Ex. 5 | |
| Bond Strength, | 1975 cps | | 1600 cps | |
| lb./linear in. | Initial | 1 Wk. | Initial | 1 Wk. |
| (a) | 7.4 | 7.1 | 7.2 | 7.2 |
| (b) | 6.5 | 4.3 | 6.7 | 6.1 |
| (c) | 6.4 | 5.2 | 7.6 | 6.5 |
| (d) | 5.7 | 5.4 | 7.7 | 6.8 |

Example 6

With the prepolymer composition of Example 1 above and the procedure of Example 2, a product was made in a 12-liter flask with a viscosity of 155 cps with 1077.7 g of MIBK, 1.2 g of dibutyltin dilaurate, 4068.6 g of prepolymer, 273 g of Hylene ® TM, 53.7 g of phthalic anhydride, 344.5 g of Epon ® 1004 and 4202.3 g of MEK. Corresponding mole ratios are 33/17/50, 1/0.87, 1/1.44, 1/0.72. The product was tested as shown in Example 8 with excellent results as shown.

Examples 7–10

Tests to compare the properties of products of this invention versus commercial products were run as shown in the tables below. As will be obvious to those familiar with the products sold commercially as 46960 (a solution of a saturated copolyester polymer) and 56065 (a polyester-urethane solution), the properties of the products of this invention are outstanding.

TABLE III

| TEST COMPOSITIONS | | | | |
|---|---|---|---|---|
| | Ex. 7 | Ex. 8 | Ex. 9 | Ex. 10 |
| Product of Example 5 | 100 | — | — | — |
| Product of Example 6 | — | 100 | — | — |
| 46960 | — | — | 100 | — |

TABLE III-continued

| TEST COMPOSITIONS | | | | |
|---|---|---|---|---|
| | Ex. 7 | Ex. 8 | Ex. 9 | Ex. 10 |
| 56065 | — | — | — | 100 |
| Mondur ® CB-75 | 3.0 | 5.4 | 3 | 5 |
| MEK | 42.8 | — | — | — |

These compositions were coated on Mylar ® at a coating weight of 5.0 lbs./ream (3000 sq. ft.), dried and sealed to another sheet of Mylar ® by means of a Sentinel Heat Sealer. One-inch strips were cut off these laminates and, after one week's ageing to effect complete cross-linking, were tested as shown below:

1. Immersed for one week in test solutions A-H (Table IV), wiped dry and aged 24 hours
2. Heated to 100° C.
3. Conditioned at 77° F., 50% relative humidity, for one week (control)

TABLE IV

| TEST SOLUTIONS | |
|---|---|
| (A) | Tapwater |
| (B) | Vegetable oil |
| (C) | 1% NaOH solution |
| (D) | 10% acetic acid solution |
| (E) | Isopropanol |
| (F) | Ethyl acetate |
| (G) | Toluol |
| (H) | Heptane |

TABLE V

| TEST RESULTS - BOND STRENGTHS LBS/LINEAR IN. | | | | |
|---|---|---|---|---|
| Test Condition | Ex. 7 | Ex. 8 | Ex. 9 | Ex. 10 |
| 1-A | 5.8 | 4.6 | 5.8 | 5.4 |
| 1-B | 5.3 | 4.8 | 5.9 | 5.2 |
| 1-C | 6.5 | 5.1 | 6.3 | 5.5 |
| 1-D | 5.1 | 5.1 | 6.1 | 4.7 |
| 1-E | 5.2 | 4.9 | 5.9 | 5.0 |
| 1-F | 0.4 | 0.2 | 0.1 | 0.3 |
| 1-G | 4.1 | 1.2 | 0.3 | 1.5 |
| 1-H | 5.2 | 4.3 | 5.6 | 4.7 |
| 2 | 1.8 | 0.4 | 0.8 | 0.9 |
| 3 | 4.0 | 4.9 | 5.9 | 4.8 |

Example 11

Tests were made to demonstrate the stability of solutions of the invention before cross-linking. The results of the tests are shown in the following self-explanatory table giving Brookfield viscosities for adhesive solutions of numbered examples above:

TABLE VI

| | SHELF STABILITY, 77° F. | | |
|---|---|---|---|
| The Adhesive Solution Of: | Initial Viscosity cps. | Viscosity, Two Weeks cps. | Viscosity, Four Weeks cps. |
| Example 3 | 2000 | 2330 | 2400 |
| Example 4 | 1975 | 2163 | 2105 |
| Example 5 | 1600 | 1775 | 1965 |
| Example 6 | 155 | — | 150 |

TABLE VII

| FREEZER, SHELF, OVEN STABILITY VISCOSITY OF THE ADHESIVE SOLUTION OF EXAMPLE 6 | | | |
|---|---|---|---|
| Initial Viscosity - 155 cps. | | | |
| | Storage at 0° F.* | Storage at 77° F.* | Storage at 120° F.* |
| Four Weeks | 150 cps. | 150 cps. | 150 cps. |
| Eight Weeks | 150 cps. | 155 cps. | 150 cps. |

*Samples were conditioned to 77° F. before testing.

We claim:

1. An epoxy-urethane consisting essentially of an epoxy endcapped and chain-extended copolyesterurethane, said epoxy-urethane being:
   I. produced by admixing
      (a) at least one copolyester, such copolyester produced by the reaction of one linear or more diols or polyether glycols with at least two different dicarboxylic acids, anhydrides of dicarboxylic acids, or methyl esters of dicarboxylic acids, about 40–80 mole percent of said dicarboxylic acids, anhydrides of dicarboxylic acids or methyl esters of dicarboxylic acids being aromatic and about 60–20 mole percent of said dicarboxylic acids, anhydrides of dicarboxylic acids, or methyl esters of dicarboxylic acids being aliphatic, and
      (b) at least one organic diisocyanate, the molar ratio of isocyanate contained on the diisocyanate to hydroxyl contained on the copolyester being about 0.7/1.0 to about 1/1, at a temperature and for a time sufficient to form a copolyester-urethane;
   II. reacted to the extent of 10 to 100% of the hydroxyl groups thereof with trimellitic anhydride or a dicarboxylic acid or anhydride thereof selected from the group consisting of malonic, succinic, glutaric, adipic, pimelic, suberic, azelaic, sebacic, brassylic, maleic, fumaric, dilinoleic, diphenic, phthalic, tetrachlorophthalic, isophthalic, terephthalic orthophthalic, cyclohexane dicarboxylic, p-phenylene diacetic, naphthalene dicarboxylic, dihydromuconic, beta-methyl adipic, trimethyl adipic, and ethylether-2,2'-dicarboxylic acids in an amount and for a time to form acid or anhydride endcapped copolyester-urethane with dicarboxylic acid or anhydride; and
   III. endcapped and/or chain-extended to form said epoxy-urethane by reacting by heat 10–100% of the carboxyl groups of said endcapped copolyester urethane with an epoxy resin of the structure

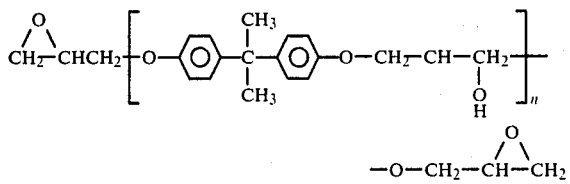

wherein
n is an integer sufficient to provide the epoxy resin with an epoxide equivalent of at least about 450 and up to about 6000.

2. An adhesive solution comprising an epoxy-urethane of claim 1 dissolved in an organic solvent.

3. The adhesive solution of claim 2 admixed with a cross-linker containing a group reactive with the hydroxyl groups on the epoxy-urethane, said compound having an average functionality of greater than 2.

4. The adhesive solution of claim 2 admixed with a polyisocyanate adduct of toluene diisocyanate and trimethylol propane.

5. An epoxy-urethane of claim 1 wherein the aromatic components of the copolyester are selected from the group consisting essentially of terephthalic acid, isophthalic acid, orthophthalic acid, phthalic anhydride and mixtures thereof and the aliphatic components are selected from the group consisting of succinic acid, glutaric acid, adipic acid, azelaic acid, pimelic acid, suberic acid, sebacic acid and mixtures thereof.

6. An epoxy-urethane of claim 1 wherein the copolyester is
   I. produced from (a) terephthalic acid, isophthalic acid, azelaic acid and ethylene glycol and (b) toluene diisocyanate,
   II. reacted with phthalic anhydride, and
   III. endcapped and/or chain-extended with an epichlorohydrin/Bisphenol A-type epoxy resin having a melting point of 95°–105° C. and an epoxide equivalent of 875°–1025.

7. An adhesive solution comprising the epoxy-urethane of claim 6 dissolved in an organic solvent.

8. The adhesive solution of claim 7 admixed with a polyisocyanate adduct of toluene diisocyanate and trimethylol propane.

9. An epoxy-urethane of claim 1 wherein the copolyester is
   I. produced from (a) terephthalic acid, isophthalic acid, adipic acid and ethylene glycol and (b) toluene diisocyanate,
   II. reacted with phthalic anhydride, and
   III. endcapped and/or chain-extended with an epichlorohydrin/Bisphenol A-type epoxy resin having a melting point of 95°–105° C. and an epoxide equivalent of 875–1025.

10. An adhesive solution comprising the epoxy-urethane of claim 9 dissolved in an organic solvent.

11. The adhesive solution of claim 10 admixed with a polyisocyanate adduct of toluene diisocyanate and trimethylol propane.

* * * * *